US011111057B2

(12) United States Patent
Patel

(10) Patent No.: US 11,111,057 B2
(45) Date of Patent: Sep. 7, 2021

(54) BIOPLASTIC COLLAPSIBLE DISPENSING TUBE

(71) Applicant: Amisha Patel, Carlsbad, CA (US)

(72) Inventor: Amisha Patel, Carlsbad, CA (US)

(*) Notice: Subject to any disclaimer, the term of this patent is extended or adjusted under 35 U.S.C. 154(b) by 512 days.

(21) Appl. No.: 15/060,921

(22) Filed: Mar. 4, 2016

(65) Prior Publication Data
US 2017/0253387 A1 Sep. 7, 2017

(51) Int. Cl.
B65D 35/08 (2006.01)
B29C 48/09 (2019.01)
(Continued)

(52) U.S. Cl.
CPC .......... B65D 35/08 (2013.01); B29C 45/0001 (2013.01); B29C 48/022 (2019.02); B29C 48/09 (2019.02); B29C 49/0005 (2013.01); B32B 1/08 (2013.01); B32B 5/145 (2013.01); B32B 15/08 (2013.01); B32B 15/085 (2013.01); B32B 15/09 (2013.01); B32B 15/20 (2013.01); B32B 27/08 (2013.01); B32B 27/22 (2013.01); B32B 27/28 (2013.01); B32B 27/32 (2013.01);
(Continued)

(58) Field of Classification Search
CPC ........ B65D 35/08; B65D 35/10; B65D 35/14; B65D 65/466; B65B 3/16; B65B 7/14; B29K 2995/006
USPC .................................................. 53/459, 469
See application file for complete search history.

(56) References Cited

U.S. PATENT DOCUMENTS 3,923,585 A * 12/1975 Vouillemin ......... B29C 65/3656
156/379.9
4,261,482 A * 4/1981 Yamada .................. B29C 49/22
222/215
(Continued)

FOREIGN PATENT DOCUMENTS

EP 2974862 A1 1/2016
EP 3 214 006 A1 9/2017
(Continued)

OTHER PUBLICATIONS

ASTM International, ASTM D6868-2011, "Standard Specification for Labeling of End Items that Incorporate Plastics and Polymers as Coatings or Additives with Paper and Other Substrates Designed to be Aerobically Composted in Municipal or Industrial Facilities." Retrieved from http://dx.doi.org/10.1520/D06868-11. Retrieved on [May 12, 2016].

(Continued)

Primary Examiner — Chelsea E Stinson
(74) Attorney, Agent, or Firm — Eversheds Sutherland (US) LLP; Christopher C. Bolten; Robert D. Ward

(57) ABSTRACT

A bioplastic collapsible dispensing tube may include a collapsible tube having walls that include a bioplastic material; a distal end of the tube that is sealed; a proximal end of the tube, opposite the distal end, that has an opening; a nozzle on the opening; and a closure for the nozzle; wherein, when the closure is opened and the tube is collapsed, flowable material inside the tube is urged out of the nozzle; and the bioplastic material includes a bio resin selected from the group consisting of PEF, PBF, PTF, GPE, GPET, PLA, PDLA, PLLA, PHA, and PHBH. A method may include forming a tube and filling the tube with flowable material from the distal end.

12 Claims, 5 Drawing Sheets

(51) Int. Cl.
| | | |
|---|---|---|
| *B29C 48/00* | (2019.01) | |
| *B65D 65/46* | (2006.01) | |
| *B32B 15/085* | (2006.01) | |
| *B32B 27/08* | (2006.01) | |
| *B32B 27/36* | (2006.01) | |
| *B32B 5/14* | (2006.01) | |
| *B32B 27/22* | (2006.01) | |
| *B32B 1/08* | (2006.01) | |
| *B32B 15/20* | (2006.01) | |
| *B32B 15/08* | (2006.01) | |
| *B32B 15/09* | (2006.01) | |
| *B32B 27/32* | (2006.01) | |
| *B32B 27/28* | (2006.01) | |
| *B29C 45/00* | (2006.01) | |
| *B29C 49/00* | (2006.01) | |
| *B65B 3/02* | (2006.01) | |
| *B65B 3/16* | (2006.01) | |
| *B65B 7/14* | (2006.01) | |
| *B65D 35/14* | (2006.01) | |
| *B65D 35/38* | (2006.01) | |
| *B65D 35/44* | (2006.01) | |
| *B29L 31/00* | (2006.01) | |

(52) U.S. Cl.
CPC .............. *B32B 27/36* (2013.01); *B65B 3/022* (2013.01); *B65B 3/16* (2013.01); *B65B 7/14* (2013.01); *B65D 35/14* (2013.01); *B65D 35/38* (2013.01); *B65D 35/44* (2013.01); *B65D 65/466* (2013.01); *B29K 2995/006* (2013.01); *B29L 2031/712* (2013.01); *B32B 2250/05* (2013.01); *B32B 2250/40* (2013.01); *B32B 2250/42* (2013.01); *B32B 2307/412* (2013.01); *B32B 2307/50* (2013.01); *B32B 2307/554* (2013.01); *B32B 2307/714* (2013.01); *B32B 2307/718* (2013.01); *B32B 2307/7163* (2013.01); *B32B 2307/724* (2013.01); *B32B 2307/726* (2013.01); *B32B 2307/7242* (2013.01); *B32B 2307/7244* (2013.01); *B32B 2307/7265* (2013.01); *B32B 2307/732* (2013.01); *B32B 2307/75* (2013.01); *B32B 2439/40* (2013.01); *B32B 2439/70* (2013.01); *B32B 2439/80* (2013.01); *Y02W 90/10* (2015.05)

(56) References Cited

U.S. PATENT DOCUMENTS

| | | | | |
|---|---|---|---|---|
| 4,951,841 A | * | 8/1990 | Tavss | B32B 15/08 222/107 |
| 6,322,899 B1 | | 11/2001 | Karhuketo | |
| 7,348,052 B2 | | 3/2008 | Mueller | |
| 2003/0211348 A1 | | 11/2003 | Mueller | |
| 2006/0032866 A1 | * | 2/2006 | Labbe | B65D 35/14 222/107 |
| 2008/0099540 A1 | | 5/2008 | Mueller | |
| 2010/0013121 A1 | * | 1/2010 | Hashimoto | B29C 55/20 264/290.2 |
| 2010/0230405 A1 | * | 9/2010 | Strait, III | B29C 65/08 220/4.01 |
| 2012/0288693 A1 | * | 11/2012 | Stanley | B32B 7/12 428/213 |
| 2013/0011631 A1 | | 1/2013 | Sakellarides | |
| 2013/0171397 A1 | * | 7/2013 | Ghosh | C08G 63/181 428/36.92 |
| 2013/0209715 A1 | * | 8/2013 | Wang | B29C 45/00 428/35.7 |
| 2014/0073745 A1 | * | 3/2014 | Bailey | B29C 49/00 525/411 |
| 2014/0124404 A1 | | 5/2014 | Abhyankar | |
| 2014/0205786 A1 | * | 7/2014 | Nederberg | C08J 5/18 428/36.92 |
| 2014/0216975 A1 | * | 8/2014 | Chrysanthidis | B65D 81/3272 206/524.6 |
| 2014/0227543 A1 | | 8/2014 | Taleyarkhan | |
| 2014/0377797 A1 | * | 12/2014 | Patel | C12P 1/00 435/41 |

FOREIGN PATENT DOCUMENTS

| | | |
|---|---|---|
| JP | 05-086307 A | 4/1993 |
| JP | 10-305532 A | 11/1998 |
| JP | 2008-220811 A | 9/2008 |
| JP | 2013-091763 A | 5/2013 |
| WO | WO-2007/130402 A2 | 11/2007 |
| WO | WO-2014/006996 A1 | 1/2014 |
| WO | WO-2015/168563 A1 | 11/2015 |

OTHER PUBLICATIONS

Biodegradable Products Institute, The Compostable Logo, Webpage [online]. BPI, Inc., 2003-2015 [retrived on May 12, 2016]. retrieved from URL<http://www.bpiworld.org/BPI-Public/Program.html>.

Dexon II Synthetic Suture product detail review from Kendell Company. [retrieved online]. [retrieved on May 16, 2016]. Retrieved from internet <URL://http://www.dentalcompare.com/4596-PGA-Sutures/37784-Dexon-II/>. no pub date.

Extended EP Search Report dated Oct. 14, 2016 in related EP Patent Appl. Serial No. 16160512.6.

Polycaprolate Trademark File (75757845). [retrieved on May 16, 2016]. Retrieved from internet <URL://http://www.tmfile.com/mark/?q= 757578458>. [Dec. 26, 2000].

\* cited by examiner

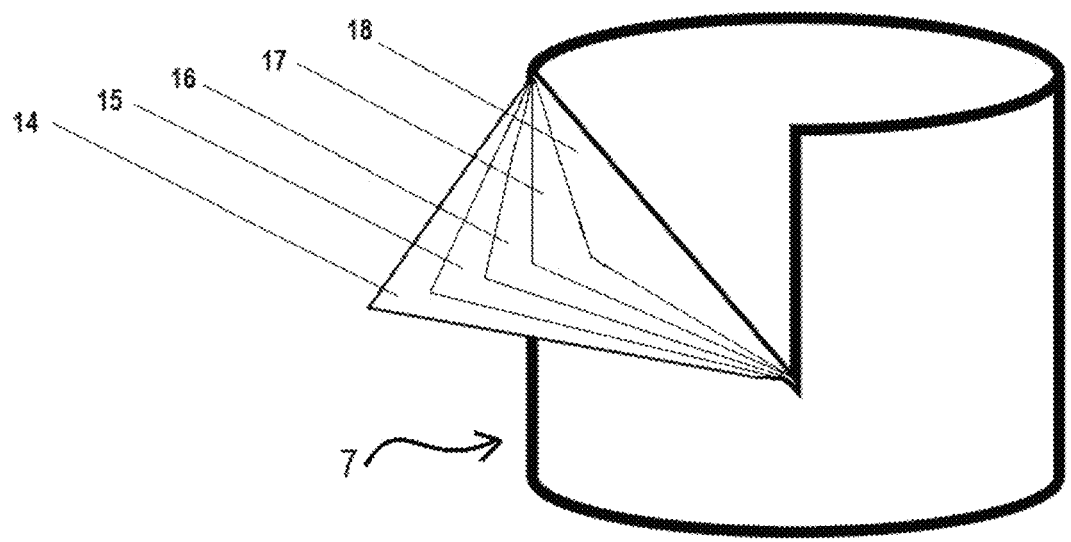
FIG 6
FIG 7
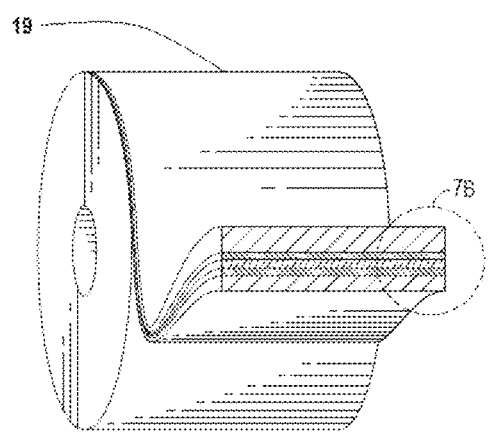
FIG 7A
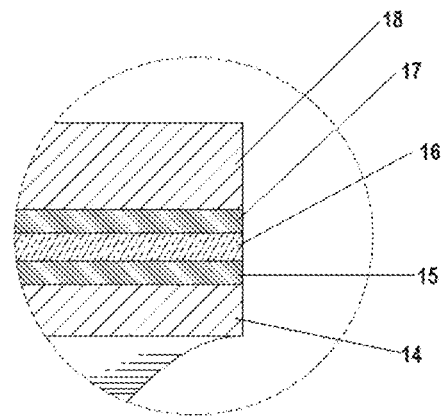
FIG 7B

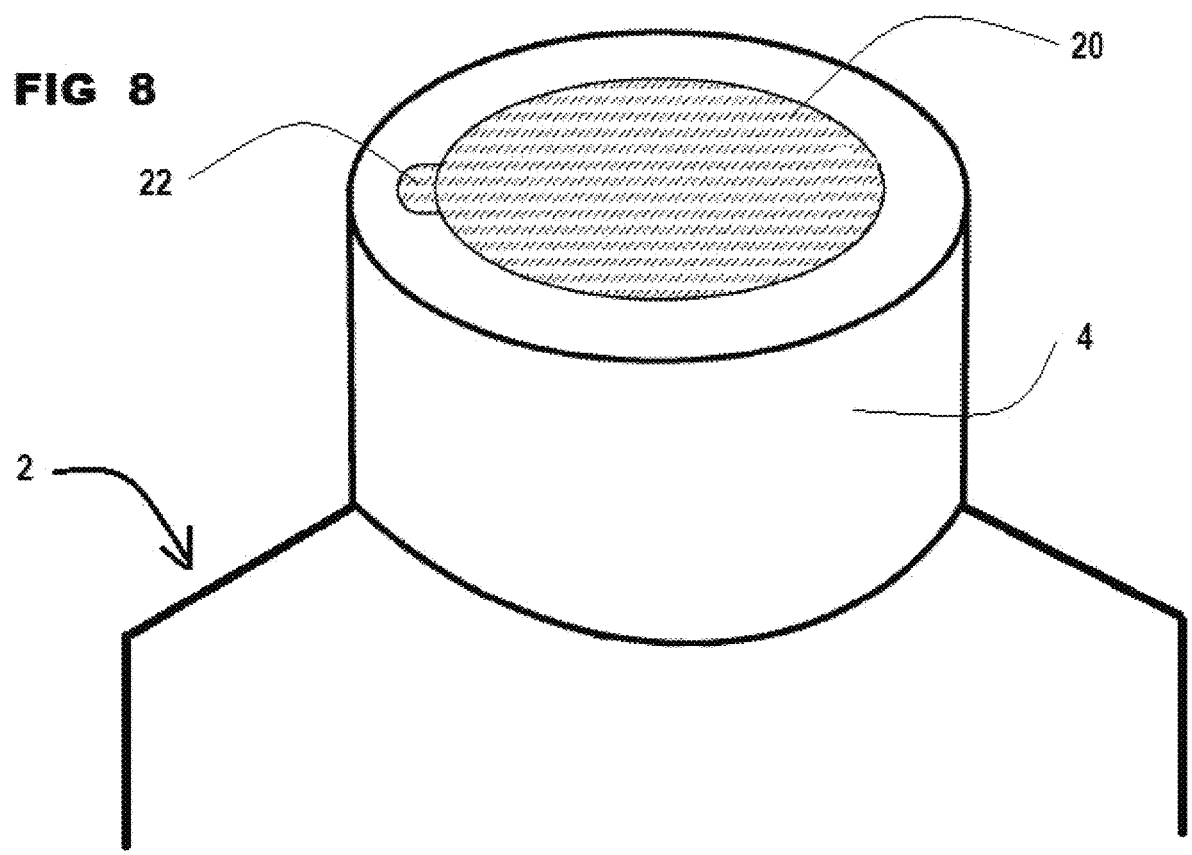

BIOPLASTIC COLLAPSIBLE DISPENSING TUBE

BACKGROUND OF THE INVENTION

The present invention relates to collapsible dispensing tubes and more specifically to tubes made of a squeeze-deformable bioplastic material.

Existing collapsible dispensing tubes include squeeze-deformable tubes for dispensing a flowable material, such as toothpaste, various ointments, glue, gels, paints, and the like. Collapsible dispensing tubes have been made of a deformable metal such as aluminum which permitted squeezing, folding or rolling up the tube in order to facilitate dispensing the full contents of the tube. Collapsible dispensing tubes have also been made of deformable plastic materials, namely Polyethylene Terephthalate (PET), High Density Polyethylene (HDPE), or Low Density Polyethylene (LDPE).

It is desirable to prepare new chemicals and materials based on renewable resources. Biomass-derived fuel and chemicals are a promising alternative to fossil based materials. Chemicals from vegetable feed stocks such as sugars, vegetable oils, organic acids, glycerol and others have been proposed as monomers for polymer production. Carbohydrates and lignin are the major sources for aromatic monomers. Chemicals 2, 5-furandicarboxylic acid (FDCA) and vanillic acid are the most important examples of such aromatic monomers. FDCA has been screened to be one of the most important building blocks or top value-added chemicals derived from biomass by the U.S. Department of Energy. Approaches to the preparation of hydroxymethylfurfural lead the way to the large-scale production of FDCA. The latter can used for the production of polyesters bearing furan moieties such as poly (ethylene 2, 5-furan dicarboxylate) (PEF), poly (butylene 2, 5-furan dicarboxylate) (PBF) poly (trimethylene furan dicarboxylate) (PTF), and poly (propylene-2-5-furandicarboxylate) (PPF) which can be bio based alternatives of terephthalates. Terephthalate is a class of high performance thermoplastic polyesters that includes poly (polyethylene terephthalate) (PET), poly (butylene terephthalate) (PBT) and poly (propylene terephthalate) (PPT). Terephthalates have advantageous properties and are used in a wide range of applications. However, terephthalate and its precursors are fossil based.

FDCA derivatives such as PBF and PEF, PTF and PPF and Para xylene are from a renewable resource and have high performance qualities, like terephthalates. FDCA and derivatives such as PBF, PEF, PTF and PPF and Para xylene are form a renewable resource that is not fossil based. The FDCA derived bio resins namely PBF, PEF and PTF and PPF and Para xylene are not compostable but are recyclable. Non FDCA but plant or sugarcane based bio resins, namely, green polyethylene, (GPE) and green polyethylene terephthalate (GPET), are other non-compostable bio resins.

It would be desirable to have a collapsible dispensing tube made of bioplastic material.

SUMMARY OF THE INVENTION

In one aspect of the present invention, a device for dispensing a flowable material, includes a collapsible tube having walls that include a bioplastic material; a distal end of the tube that is sealed; a proximal end of the tube, opposite the distal end, that has an opening; a nozzle on the opening; and a closure for the nozzle; wherein, when the closure is opened and the tube is collapsed, flowable material inside the tube is urged out of the nozzle; and the bioplastic material includes a bio resin selected from the group consisting of PEF, PBF, PTF, GPE, GPET, PLA, PDLA, PLLA, PHA, and PHBH.

In another aspect of the present invention, a method for making a bioplastic collapsible dispensing tube includes providing a tube having walls that contain bioplastic material, the tube having a distal end and a proximal end; attaching a nozzle and closure to the proximal end; filling the tube with flowable material from the distal end; and sealing the distal end; wherein the bioplastic material includes a bio resin selected from the group consisting of PEF, PBF, PTF, GPE, GPET, PLA, PDLA, PLLA, PHA, and PHBH.

BRIEF DESCRIPTION OF THE DRAWINGS

FIG. 6 depicts an embodiment of a tube wall with laminated layers;

FIGS. 7A and 7B depict an embodiment of a roll of laminated material according to the present invention; and FIG. 8 depicts an embodiment of a one-time seal according to the present invention.

DETAILED DESCRIPTION

Figure 1:
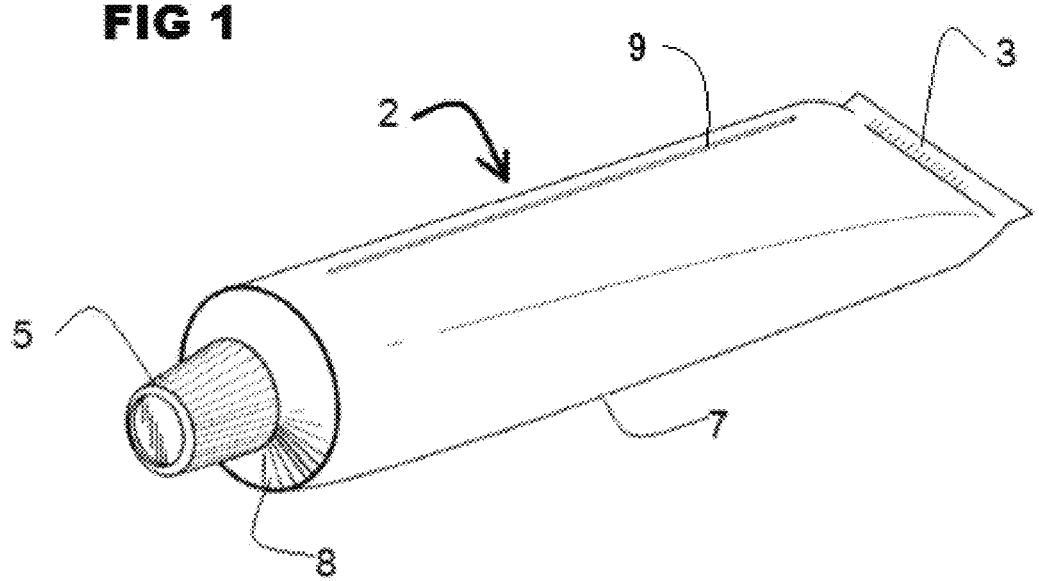
FIG. 1 is a perspective view of an embodiment of the present invention.

The preferred embodiment and other embodiments, which can be used in industry and include the best mode now known of carrying out the invention, are hereby described in detail with reference to the drawings. Further embodiments, features and advantages will become apparent from the ensuing description, or may be learned without undue experimentation. The figures are not necessarily drawn to scale, except where otherwise indicated. The following description of embodiments, even if phrased in terms of "the invention" or what the embodiment "is," is not to be taken in a limiting sense, but describes the manner and process of making and using the invention. The coverage of this patent will be described in the claims. The order in which steps are listed in the claims does not necessarily indicate that the steps must be performed in that order.

An embodiment of the present invention generally provides a collapsible dispensing tube made of bio plastic resin.

An object of the present invention is to provide a collapsible dispensing tube and a removable cap, made from renewable bio resins, such as non compostable GPE, GPET, PBF, PEF, PTF, PPF and para xylene compostable bio resins PLA, PHA, PHBH, PDLA, and PLLA. The compostable bio resins may include a flex agent such as ATCB, PBAT and PCL.

Bio resins derived from a renewable resource may be used for collapsible dispensing tubes. Embodiments of the present invention may use a bioplastic material with these bio resins to replace plastic made collapsible tubes and other plastic items. These collapsible dispensing tubes can also be made from bio resins that are compostable. These resins includes polylactic acid (PLA) from corn and cellulose, Poly3-hydoxybutrate-3-hydroxyhexxanate (PHBH) from a fermentation process using glucose and propionic acid as the carbon source for *Alcaligenes eutrophus*, and polyhydroxyalkanoate (PHA) derived by plant fermentation. Poly L lactide (PLLA) and poly D lactide (PDLA) are forms or homo-polymers of PLA. PLA, PDLA, and PLLA are especially compostable and can be degraded to make eco-friendly compost or humus.

Embodiments of bioplastic material may include compostable bio resins such as PLA, PHA, PHBH, PDLA, and PLLA. These resins are generally not flexible and a flex agent may be added to the bioplastic material or resin. Acetyl tributyl citrate (ATBC) is a transparent biodegradable plasticizer having low toxicity. It is also referred to as tributyl acetyl citrate, butyl acetylcitratem, O-acetylcitric acid tributyl ester, ATCB, or acetyl tributylcitrate. It has molecular formula $C_{20}H_{34}O_8$. Other flex agents are poly (butylene adipate) (PBA), Poly ε-caprolactone (PCL), and poly (butylene adipate-co-terephthalate) (PBAT). In an embodiment, ACTB, PBAT and PCL are used in ratio of 5 to 20% by weight.

Bio resins such as PLA, PHA, PHBH, PLLA PDLA PEF, PBF, and PTF, when compared to PET and GPE, have high permeation rate to water vapor, oxygen and carbon dioxide. In order to reduce good permeation rate, multi layered laminate bio resin laminar band with metalized foils like aluminum and tin may be utilized Embodiments of collapsible dispensing tubes may be made from bioplastic material that includes renewable bio resins derived from plants or a renewable resource as mentioned above. These collapsible dispensing tubes may have a sealed crimp at a distal or rear, sealed end, and a narrow nozzle or opening at a proximal or front, dispensing end, opposite the distal end. Embodiments may have a closing structure such as a valve or cap on the proximal end. Embodiments of a closing structure may include a resealable screw-on cap that is also made of bioplastic material. Embodiments may include a one-time removable seal made of paper or foil over the nozzle, to be removed and disposed of before dispensing the flowable material. These tubes may be made using these bio resins via an extrusion molding process or via injection or blow molding. The viscous material to be dispensed from the collapsible tube can be inserted from the distal end, and this end can then be sealed to form an embossed, crimped sealed end. The tube size can vary from ¼ oz. to over 120 oz. The wall thickness can also vary to accommodate the size from 0.1 mm to 2.5 mm or higher. The outer surface may be print or label ready. The proximal end may be oval but can be triangular, square, rectangular or multisided such as hexagonal or octagonal.

Embodiments of a collapsible tube may also be made from a flat sheet of the bio resin material, where one side and the distal end are crimped and sealed. The proximal end of the tube may have an attachment with a nozzle that comprises a circular opening on a closed, sealed neck. Embodiments of open circular nozzles may have various shapes, including long (nasal neck), lube tip (grease tip), eye, nasal or round, etc. Embodiments of caps may also be of various types, including grease, nasal, fez, mushroom, ophthalmic, pedestal flip top, small flip top, tall fez, and reverse taper with puncture top, etc. The proximal end may also be a spout fitment that is secured to a laminate layer made of bio resin sheet and a metalized foil, or bio resin aluminum barrier laminate (BABL). BABL differs from aluminum barrier laminate (ABL) or plastic barrier laminate in that the BABL has bio resins layers with an aluminum layer and no plastic layers except the permeation barrier layer.

Embodiments of bio resin made collapsible tubes may range from diameter 10 to 100 mm. Length may vary according to requirement in a range of 50 to 400 mm. Embodiments of tubes may be used for packing an assortment of different products such as pharmaceutical ointments, creams and gels, rubber based adhesives, rubber cement, epoxy, silicone sealants, toothpaste, shaving cream body gels skin ointments etc. These collapsible tubes can be multilayered. Multi laminated tubes may have 2 to 9 or more layers and have various thickness from 15 to 90 microns per laminated layer. The bio resins used for lamination may include PEF, PBF, PTF, PPF, para xylene, GPE, GPET, PLA, PDLA, PLLA, PHA and PHBH. Total thickness of the multi layer laminated wall may vary from 200 to 300 microns. The multi lamination materials may be non bio resin materials such as an aluminum or tin foil, EVOH (ethylene vinyl alcohol copolymer), GPE, or GPET film to aid in the permeation properties, which may vary in thickness from 10-90 microns. The foil or film thickness for aluminum or tin may vary from 0.0002 to 0.002 of inch or 10 to 60 microns. The bio resin laminated layers are referred to as bio resin aluminum barrier laminate barrier (BABL) and differ from aluminum barrier laminate (ABL) or plastic barrier laminate. The width of the BABL may vary from 10 to 700 mm.

Embodiments of collapsible tubes may be formed of a laminar structure. The single or multi laminate band to make the collapsible tube may be formed using bio resin mentioned above with, for example, a metalized aluminum or tin foil, a monolayer bio resin extruded film, a multi-layered bio resin extruded film, a multi-layered bio resin laminated film, or a co-extruded bio resin film.

Polymeric films are widely used in the packaging field for the packaging of products, especially pharmaceutical or food products. Films used for the packaging of food generally contain multiple layers, in which each layer adds certain desired physical or chemical properties to the completed film. For example, a "barrier" layer may serve to protect the packaged product from physical stresses caused by the normal handling of the product during packaging, shipping, or during commercialization. In addition, a heat sealant layer may be utilized to bond films together to form packages for products, such as pharmaceutical or food products. Further, the combination of layers may allow for a film that has favor-able physical properties, such as, for example, strength, stiffness, abrasion and chemical resistance.

Multi-layer polymeric films may have high strength, stiffness, abrasion resistance and/or chemical resistance. Such films may have a barrier layer of ethylene-vinyl alcohol copolymer (EVOH) sandwiched by layers bio resins. In some cases, these layers do not gel together, so a multilayer film would delaminate. To overcome this issue, thin layers of special adhesive resins, which are generally known as tie layers, may be used in between the bio resin and non bio resin layers such as EVOH. Examples may include, but are not limited to, the five-layer films of material listed in TABLE 1.

TABLE 1

|   | Resins | Example | | | | | | | |
|---|---|---|---|---|---|---|---|---|---|
|   |   | 1 | 2 | 3 | 4 | 5 | 6 | 7 | 8 |
| 1 | PLA | 2 | 2 | 2 |   |   |   | 1 |   |
| 2 | PLLA |   |   | 2 | 2 | 1 | 1 |   |   |
| 3 | Alu | 1 |   |   |   | 1 | 1 | 1 |   |
| 4 | PDLA |   |   |   |   |   |   |   | 2 |
| 5 | GPE |   | 1 |   | 1 |   |   |   | 1 |
| 6 | PE |   |   |   |   |   | 1 |   |   |
| 7 | PT |   |   |   |   |   |   | 1 |   |

TABLE 1-continued

| | Resins | 1 | 2 | 3 | 4 | 5 | 6 | 7 | 8 |
|---|---|---|---|---|---|---|---|---|---|
| 8 | PP | | | | | | | 1 | |
| 9 | EVOH | | | 1 | | | | | |
| 10 | Adhesive | 2 | 2 | 2 | 2 | 2 | 2 | 2 | 2 |
| Layers | | 5 | 5 | 5 | 5 | 5 | 5 | 5 | 5 |

Embodiments of aluminum collapsible tubes may be generally 0.010 to 0.020 inches or 250 to 500 microns thick, and may have excellent barrier properties for Oxygen, with oxygen transmission rate (OTR) 0 cc-mil/100 inch square or water vapor, moisture vapor transmission rate (MVTR) 0 gm-mil/100 inch square. The bio resins have a much higher permeation rate for Oxygen, OTR 38-42 cc-mil/100 inch square or water vapor, MVTR 18-22 g-mil/100 inch square. To overcome this major disparity in permeation, an aluminum foil 0.0002 of inch to 0.002 of inch or 10 to 60 microns in thickness may be inserted in the extruded bio resin tube just prior to filling the collapsible tube with product. This creates a barrier that meets the aluminum tube standards.

Embodiments may include a one-time seal, on the foil pouch or on the nozzle, made of bioplastic or other disposable material, that can be removed or perforated to open the tube and/or foil pouch and allow access to the flowable material. The one-time removable seal may help protect the flowable material during shipping, and then be removed and discarded before dispensing.

The resealable cap may be removed, the removable seal (if any) may be removed or perforated, and the contents of the tube may dispensed through the nozzle by manually squeezing the tube will collapse the tube, which reduce the tube volume, thereby forcing the contents out through the open end.

FIG. 1 depicts an embodiment of a bioplastic collapsible dispensing tube 2 with a sealed tube bottom 3, a sealed side 9, tube walls 7, a tube top 8, and a bioplastic resealable cap 5.

Figure 2:
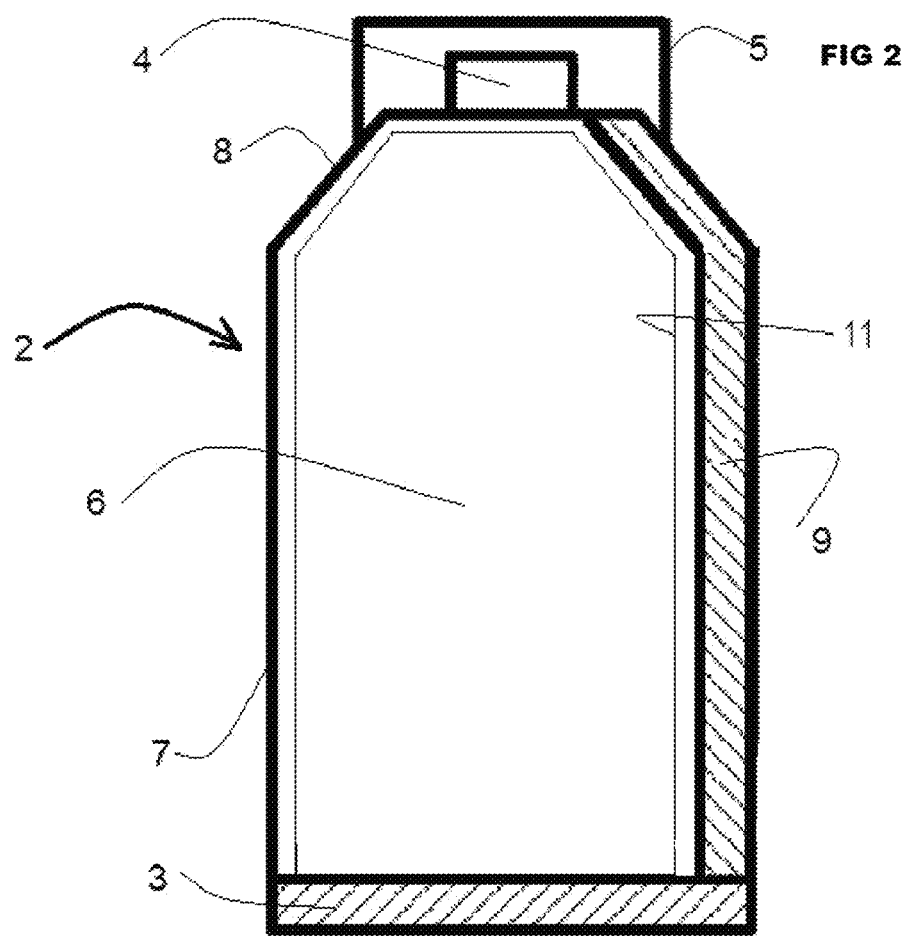
FIG. 2 is a longitudinal cross section view of an embodiment of the present invention.

FIG. 2 depicts an embodiment of a bioplastic collapsible dispensing tube 2 that may dispense a flowable material 6, such as, for example, toothpaste, ointment, or gel. Embodiments of tube 2 may include a distal end or tube bottom 3, tube walls 7, and a proximal end or tube top 8 opposite tube bottom 3. Tube top 8 may have a nozzle 4 that allows the flowable material 6 to escape from an internal chamber when tube 2 is collapsed, such as from being squeezed or rolled up by a user. Embodiments may include a bioplastic resealable cap 5 that releasably closes and opens nozzle 4. Embodiments may include a sealed side 9 along a side of the tube. Embodiments may include a foil pouch 11 within tube 2, that forms a lining or chamber. The foil pouch 11 or laminate layer may have an opening at its top that corresponds with nozzle 4 of tube 2, to allow the flowable material 6 to be dispensed.

Tube bottom 3 and sealed side 9 may be permanently closed during manufacture, such as by crimping or adhering together the edges of a sheet of bioplastic material. Resealable cap 5 may be a screw top or other closure made of bioplastic that can be removed from nozzle 4 to open the nozzle and allow access to the flowable material 6, and reattached to nozzle 4 to close the nozzle and seal the flowable material 6 within tube 2. Resealable cap 5 may be made of bioplastic material, and may have threads that correspond with threads in nozzle 4 so that cap 5 may be screwed onto nozzle to close and form a seal, and then unscrewed to allow access to the flowable material 7.

Figure 3:
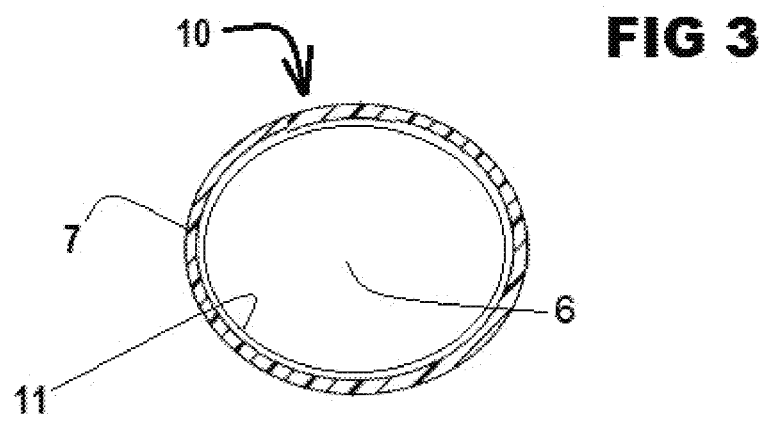
FIG. 3 is a top cross section view of an embodiment of the present invention.

FIG. 3 depicts another embodiment having a collapsible round tube 10, with tube walls 7 and a foil pouch 11 to retain and dispense a flowable material 6. This embodiment is formed from a tube of bioplastic material. Instead of sealing the edges of a sheet of flat material, the bioplastic material is molded or extruded to form a tube or cylinder. The extrusion process may be multilayered or separately laminated to achieve embodiments of a laminated wall as shown in FIGS. 6 and 7. These multilayered laminate may include a metal foil layer of aluminum or tin.

Figure 4:
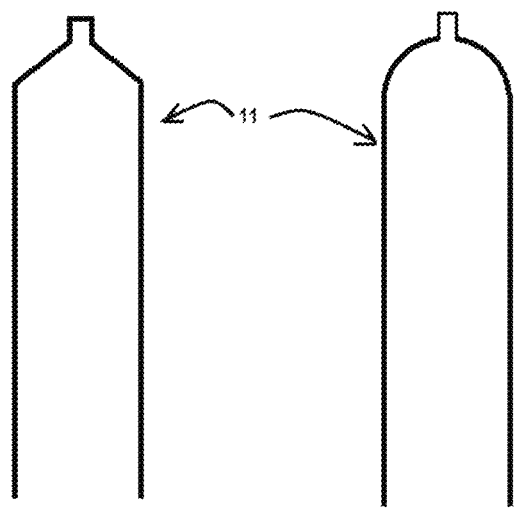
FIG. 4 depicts embodiments of a foil pouch according to the present invention.

FIG. 4 depicts two embodiments of a foil pouch 11. Foil pouch 11 may have sharp lines and corners that correspond to the lines and corners of the main tube, or rounded corners that have strength to withstand the pressure when the tube is collapsed to squeeze the flowable material out of the tube. Embodiments of foil pouch 11 may be made of a thin layer of deformable metal such as aluminum or tin.

Figure 5:
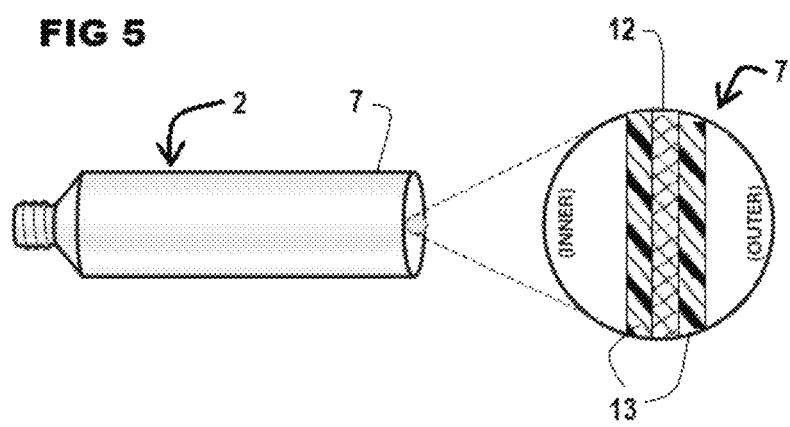
FIG. 5 depicts an embodiment of a tube wall according to the present invention.

FIG. 5 depicts an embodiment of a tube wall 7 for a bioplastic collapsible dispensing tube 2. Embodiments of a tube wall 7 may include one or more thin layers metal foil 12 such as aluminum (Al), tin (Sn), or other thin layers of metal, between or outside of layers of bioplastic material 13. Embodiments may include an inner and outer layer of bioplastic material 13 that may have various thicknesses or compositions. The collapsible tube may be multi laminated with, for example, 2 to 9 layers using different combination of bio resins layers laminated with aluminum or tin foil.

FIG. 6 depicts an embodiment of tube wall 7 with multiple laminated layers. Alternating layers of aluminum foil and bioplastic 14, 15, 16, 17, and 18 may be laminated to provide a bio resin aluminum barrier laminate (BABL). Wall 7 may be manufactured in multiple layers that are permanently sandwiched together, such as with adhesives, to achieve a laminated wall with enhanced barrier properties.

FIG. 7A depicts an embodiment of a roll of laminated material. In an embodiment of a method, a bio resin aluminum barrier laminate (BABL) may be manufactured and initially formed into a roll. The roll of BABL may then be unrolled and sheets of BABL cut off to provide the tube walls of a bioplastic collapsible dispensing tube.

FIG. 7B depicts an embodiment of BABL material that may include multiple layers as described in TABLE 1, which lists many examples of five layered laminates. For example, Example 1 (column 1 of Table 1) includes two layers of PLA as layers 14 and 18, one layer of aluminum as layer 16, and two layers of adhesive as layers 15 and 17. Embodiments of Example 1 may have layers of varying thickness, e.g. the inner layer of PLA 14 may be thinner than the outer layer of PLA 18.

FIG. 8 depicts an embodiment of a one-time seal 20. The opening at the top of nozzle 4 of tube 2 may include a one-time seal 20 of aluminum or bioplastic material, that can be removed or perforated to open tube 2 and allow access to the flowable material. The one-time seal may help protect the flowable material 6 during shipping, and may act as a tamper evident protection seal, and then be removed and discarded before dispensing the flowable material. As depicted in the embodiment of FIG. 8, one-time seal 20 may have a tab 22 so it can be removed from the end of the nozzle 4. In other embodiments, a one-time seal may cover foil pouch and may be perforated to allow access.

Embodiments of the present invention include methods for making a bioplastic collapsible dispensing tube. In one embodiment, non compostable bio resins such as PEF, PBF, PTB, PPF, and para xylene may be injection molded, blow molded or extruded to obtain a tube or flat sheet. Other embodiments may include a compostable bioplastic resin such as PLA, PHA, PHBH, PDLA, or PLLA, that further include a flex agent, such as ATCB, PBAT and PCL. Embodiments may provide a tube and cap that include a bioplastic material.

In an embodiment utilizing a bioplastic sheet, the proximal end of the sheet receives a nozzle opening and removable cap, the side edge is crimped and sealed, and the distal end is left open. A cylindrical aluminum foil pouch may be inserted, the flow material is then filled using the distal end, then this end is crimped and sealed. The tube may be multi laminated with a plurality of layers, such as one or more layers of foil or permeation layer of GPE, GPET or EVOH, sandwiched between corresponding layers of bioplastic. Embodiments may include a layer of metal foil and a layer of bioplastic. The collapsible tube may be multi laminated with 2 to 9 layers using different combination of the bio resins layer and the lamination can include an aluminum or tin foil.

In embodiments, a tubular element having a proximal end may be molded to have an open nozzle on a proximal end, to which is attached a removable cap. The distal or bottom end is initially open. To achieve the barrier properties of aluminum, a cylindrical aluminum foil pouch is inserted into the tube or the aluminum layer incorporated by using aluminum laminated layer in the manufacturing of the tube, prior to filling the tube with the flowable material. Once the flowable material is filled from the distal end, the distal end is crimped and sealed.

In embodiments, the resealable cap may be removed, the removable seal (if any) may be removed, and the contents of the tube may dispensed through the nozzle by manually squeezing or rolling the tube up. This will collapse the tube, which reduces the tube volume, thereby forcing the contents out through the open end.

Embodiments may include a collapsible dispensing tube made from bio resins that are not compostable, such as: Poly (ethylene 2, 5-furan dicarboxylate) (PEF), Poly (butylene 2, 5-furan dicarboxylate) (PBF), Poly (tri methylene furan dicarboxylate) (PTF), Poly (propylene-2-5-furandicarboxylate) (PPF), Para xylene, Green poly ethylene (GPE), and Green ethylene terephthalate (GPET). Embodiments may include a collapsible dispensing tube made from compostable bio resins with a flex agent (5-20% by Weight), such as PCL, PBAT and ATCB; PLA; PDLA, PLLA, PHA, and PHBH. Embodiment of a multi laminated bio resin collapsible tube may use multiple materials or combination bio resins such as: PEF, PBF, PTF, PPF, Para xylene, GPE, GPET, PLA, PDLA, PLLA, PHA and PHBH, plus a tin or aluminum foil layer or pouch. Embodiments may include multi lamination of 2 to 9 or more layers of a bio resin such as PEF, PBF, PTF, PPF, Para xylene, GPE, GPET, PLA, PDLA, PLLA, PHA and PHBH, with thickness of 10-90 microns and aluminum or tin foils in thickness of 10 to 60 microns. Embodiments may insert aluminum foil in the extruded bio resin tube to create a barrier, or can be part of the multilayer laminate i.e. BABL. Embodiments may include a collapsible tube formed of at least one of: a metalized (aluminum or tin foil) film, a monolayer extruded film, a multi-layered extruded film, a multi-layered laminated using film or a co-extruded film made from bio resins.

I claim:

1. A device for dispensing a flowable material, comprising:
   a collapsible tube comprising a wall comprising a first layer of bioplastic material, a second layer of bioplastic material and a thin layer of metal foil sandwiched between and adjacent to a first layer of adhesive and a second layer of adhesive, the first layer of adhesive positioned adjacent the first layer of bioplastic material and the second layer of adhesive positioned adjacent to the second layer of bioplastic material:
   a distal end of the tube that is sealed; and
   a proximal end of the tube, opposite the distal end, that has an opening;
   a nozzle on the opening; and
   a closure for the nozzle;
   wherein, when the tube is configured to collapse to urge the flowable material inside the tube out of the nozzle;
   wherein the first layer of bioplastic material and the second layer of bioplastic material comprise a bio resin selected from the group consisting of:
   poly (ethylene 2, 5-furan dicarboxylate) (PEF),
   poly (butylene 2, 5-furan dicarboxylate) (PBF), and
   poly (tri methylene furan dicarboxylate) (PTF);
   wherein the first layer of bioplastic material and second layer of bioplastic material, each comprising the bio resin, further comprise one or more flex agents in a ratio of 5 to 15% total flex agent to total weight, wherein the one or more flex agents comprises acetyl tributyl citrate (ATBC), and
   wherein the thin layer of metal foil is aluminum foil.

2. The device of claim 1, further comprising a metal foil pouch within the tube that retains the flowable material.

3. The device of claim 1, wherein the bio resin is selected from the group consisting of:
   poly (butylene 2, -5-furan dicarboxylate) (PBF), and
   poly (tri methylene furan dicarboxylate) (PTF).

4. A method for making a collapsible dispensing tube, comprising:
   providing a tube having a distal end and a proximal end, the tube comprising a wall comprising a first layer of bioplastic material, a second layer of bioplastic material and a thin layer of aluminum foil sandwiched between and adjacent to a first layer of adhesive and a second layer of adhesive, the first layer of adhesive positioned adjacent the first layer of bioplastic material and the second layer of adhesive positioned adjacent to the second layer bioplastic material;
   attaching a nozzle and closure to the proximal end;
   filling the tube with flow able material from the distal end;
   sealing the distal end;
   wherein the first layer of bioplastic material and the second layer of bioplastic material comprise a bio resin selected from the group consisting of:
   poly (ethylene 2, 5-furan dicarboxylate) (PEF),
   poly (butylene 2, 5-furan dicarboxylate) (PBF), and
   poly (tri methylene furan dicarboxylate) (PTF); and
   wherein the first layer of bioplastic material and the second layer of bioplastic material each comprising the bio resin, further comprise one or more flex agents in a ratio of 5 to 15% total flex agent to total weight, wherein the one or more flex agents comprises acetyl tributyl citrate (ATBC).

5. The method of claim 4, further comprising:
   sealing a side of each of the first layer of bioplastic material and the second layer of bioplastic material together.

6. The method of claim 4, further comprising:
   injection molding, blow molding, or extruding the bio resin to provide the first layer of bioplastic material and the second layer of bioplastic material; and
   inserting a foil pouch into the tube.

7. The method of claim 4, wherein the bio resin is selected from the group consisting of:
poly (butylene 2, 5-furan dicarboxylate) (PBF), and
poly (tri methylene furan dicarboxylate) (PTF).

8. A device for dispensing a flowable material, comprising:
a collapsible tube comprising a multilayer wall, the multilayer wall comprising:
a first layer of bioplastic material, a second layer of bioplastic material, each of the first layer of bioplastic material and the second layer of bioplastic material comprising a bio resin, the bio resin selected from the group consisting of:
poly (ethylene 2, 5-furan dicarboxylate) (PEF),
poly (butylene 2, 5-furan dicarboxylate) (PBF), and
poly (tri methylene furan dicarboxylate) (PTF); and
a barrier layer positioned between and adjacent to a first layer of adhesive and a second layer of adhesive, the first layer of adhesive positioned adjacent to the first layer of bioplastic material and the second layer of adhesive positioned adjacent to the second layer of bioplastic material;
a distal end of the tube that is sealed;
a proximal end of the tube, opposite the distal end, that has an opening; and
a nozzle coupled to the opening,
wherein the first layer of bioplastic material further includes, in addition to the bio resin, one or more flex agents comprising acetyl tributyl citrate (ATBC), and
wherein the barrier layer is a thin layer of aluminum foil.

9. The device of claim 8, wherein the multilayer wall is a bio resin aluminum barrier laminate (BABL).

10. The device of claim 8, wherein the bio resin is injection molded, blow molded, or extruded to provide the first layer of bioplastic material and the second layer of bioplastic material.

11. The device of claim 8, wherein the one or more flex agents are in a ratio of 5 to 15% total flex agent to total weight.

12. The device of claim 8, wherein the bio resin is selected from the group consisting of:
poly (butylene 2, 5-furan dicarboxylate) (PBF), and
poly (tri methylene furan dicarboxylate) (PTF).

* * * * *